(12) United States Patent
Roshko

(10) Patent No.: US 7,333,500 B2
(45) Date of Patent: Feb. 19, 2008

(54) METHODS FOR DISCOVERING NETWORK ADDRESS AND PORT TRANSLATORS

(75) Inventor: Michael E Roshko, Brentford (GB)

(73) Assignee: Nortel Networks Limited, St. Laurent (CA)

( * ) Notice: Subject to any disclaimer, the term of this patent is extended or adjusted under 35 U.S.C. 154(b) by 1045 days.

(21) Appl. No.: 10/253,097

(22) Filed: Sep. 24, 2002

(65) Prior Publication Data
US 2004/0057385 A1 Mar. 25, 2004

(51) Int. Cl.
H04L 12/56 (2006.01)

(52) U.S. Cl. .................. 370/401; 370/389; 370/392

(58) Field of Classification Search ............. 370/252, 370/351–352, 389, 392, 393, 395.2, 395.3, 370/395.5, 395.52, 395.53, 401
See application file for complete search history.

(56) References Cited

U.S. PATENT DOCUMENTS

| 6,760,780 | B1 * | 7/2004 | Chitturi et al. | 709/248 |
| 6,885,658 | B1 * | 4/2005 | Ress et al. | 370/352 |
| 7,054,325 | B1 * | 5/2006 | Archibald | 370/410 |
| 2003/0212772 | A1 * | 11/2003 | Harris | 709/220 |
| 2004/0252683 | A1 * | 12/2004 | Kennedy et al. | 370/389 |

FOREIGN PATENT DOCUMENTS

| WO | WO-02/03217 A1 | 1/2002 |
| WO | WO-02/19644 A1 | 3/2002 |
| WO | WO-02/07330 A2 | 9/2002 |

* cited by examiner

Primary Examiner—Wing Chan
Assistant Examiner—Saba Tsegaye
(74) Attorney, Agent, or Firm—Withrow & Terranova, PLLC

(57) ABSTRACT

Network Address and Port Translators (NATs) have the potential to interrupt the end-to-end nature of Internet applications, thereby threatening end-to-end security and other end-to-end functions. Thus it is important to be able to discover the existence of NATs and their type. Accordingly there is provided a method of discovering the existence and type of NAT that involves instigating a test call between media endpoints on a Media Gateway (MG) and a Media Gateway Controller (MGC). The MGC is able to deduce the existence of a NAT by examining the media packets sent to its endpoint. If a NAT is determined to be present the MGC instructs the endpoint on the MG to send media packets to another endpoint on the MGC. By comparing the IP addresses and ports of the media packets received at the endpoints of the MGC, the MGC is able to deduce whether the type of NAT is Cone or Symmetric.

26 Claims, 6 Drawing Sheets

METHODS FOR DISCOVERING NETWORK ADDRESS AND PORT TRANSLATORS

FIELD OF THE INVENTION

The present invention relates to a method of discovering Network Address and Port Translators, and, more particularly, to method of discovering Network Address and Port Translators sitting between Telephony Service Provider Networks and Networks containing Media Gateways.

BACKGROUND OF THE INVENTION

Network Address Translators (NATs) are used to interconnect a private network consisting of unregistered Internet Protocol (IP) addresses with a global IP network using a limited number of registered IP addresses. NATs are also used to avoid address renumbering in a private network when topology outside the private network changes for variety of reasons, such as customers changing providers, company backbones being reorganized, or providers merging or splitting. In addition, there are many other applications of NAT operation.

Basic Network Address Translation or Basic NAT is a method by which IP addresses are mapped from one group to another, transparent to end users. Network Address Port Translation, or NAPT is a method by which many network addresses and their Transmission Control Protocol/User Datagram Protocol (TCP/UDP) ports are translated into a single network address and TCP/UDP ports. Together, both these operations are referred to as traditional NAT.

NAT operation is asymmetrical with respect to the two Networks with which the NAT interfaces. In general, packets originating in the private network ("inside") are allowed to be sent to any address in the other network ("outside"). When the first packet of such a packet flow traverses the NAT, a NAT bind will be created, and the source IP address and port of the packet will be changed to reflect the NAT bind. Thus, when the packet arrives at its destination, it will appear to have come from a different source (i.e. from the NAT device). All subsequent packets of the flow will be modified in the same way. In contrast, packets originating from the outside network can not be routed to a host in the inside network, unless a NAT bind has previously been created in the NAT device. In such a case, the packets will have to be addressed to the IP address and port of the NAT bind on the NAT device. Upon receipt of the packets, the NAT device will translate the destination address and port into the proper inside address and port, and forward the packets on to their inside destination. Because of this asymmetry, hosts in the "inside" network are said to be "behind the NAT".

NATs are further classified based on the rules used to create NAT binds. NATs which create a unique bind for unique source and destination IP addresses and ports are known as Symmetric. NATs which create a unique bind for a unique source addess and port only (i.e. for any destination) are known as Cone.

Unless mentioned otherwise, the term NAT, as used in this specification, will pertain to traditional NAT, namely basic NAT as well as NAPT, and to the devices performing these functions: Network Address Translators, and Network Address and Port Translators.

A number of NAT deployments are currently in use and, naturally, a large number of internet applications work transparently with NATs. However, there are applications that fail if their packets traverse a NAT, such as applications that set-up voice over Internet Protocol (VoIP) calls. VoIP works by the two media endpoints involved in the call exchanging their Session Description Protocol (SDP). The SDP describes the IP address and port where the endpoint expects to receive media for the call, among other things. This exchange of SDP is made possible by the use of a protocol such as SIP, MGCP, H.248 (MEGACO), H.323, NCS or ASPEN, and often involves the help of a Media Gateway Contoller (MGC), typically a softswitch, to broker the exchange. NATs break this model, since the IP address and port embedded in SDP will not reflect the IP address and port modifications made by the NAT. In cases where NATs break the end-to-end functionality of applications, Application Level Gateways (ALGs) are required within the NAT to make application-specific changes to the packet contents so that it reflects the NAT bind, in order to ensure that the application can work through the NAT.

NATs have the potential to interrupt the end-to-end nature of Internet applications, thereby threatening end-to-end security and other end-to-end functions. In addition, NATs have topology restrictions and other constraints on the protocols and applications that run across the NATs. Thus it is important to be able to discover the existence of NATs and their type.

Known techniques for VoIP applications in which an MGC in a public TSP network is controlling a Media Gateway (MG) in a private network, involve determining a NAT's existence and type either through 'ad hoc' methods (for example, telephoning the owner of the MG and asking if they are using a NAT and then provisioning this information (by hand) into the MGC prior to bringing the MG into service), or by using a protocol such as Simple Traversal of UDP through NATs (STUN) to discover the presence and type of NATs between the MG and the TSP network. STUN is an Internet Engineering Task Force (IETF) Protocol, defined in the IETF draft "http://www.ietf.org/internet-drafts/draft-ietf-midcom-stun-02.txt", that allows applications to discover the presence and types of NATs in a network, as well as discovering the actual NAPT bind used for a particular media flow. It requires a STUN server in the outside network, and a STUN client in the inside network. By using the STUN protocol between the STUN client and server, the STUN client in the inside network is able to determine NAT existence, type and the actual NAT bind used for a media flow.

The disadvantage of the first technique is that it requires manual human intervention, and is unfeasible as a real solution. The disadvantage of the second technique is that STUN requires the introduction of new network components (STUN clients and servers) in both the TSP and MG networks. In addition, the STUN client must be integrated into the MGs themselves, which means that existing, deployed MGs must be upgraded to contain STUN clients before this technique can be used. Another disadvantage of the second technique is that NAT information is determined by the STUN client behind the NAT (i.e. by an agent in the inside), rather than by the MGC outside of the NAT, although the MGC may need to have knowledge of this information.

Thus there is a need for devising a method of discovering the existence of NATs and their type without requiring any new network elements, without requiring any new protocols or protocol extensions, without requiring any work on the MGs or NATS, without imposing any requirements on the networks outside the TSP network, that will work with existing deployments, using existing protocols.

The present invention aims to address the needs or at least mitigate the problems identified above.

SUMMARY OF THE INVENTION

Accordingly, there is provided a method of determining the presence of a Network Address and Port Translator between a Telephony Service Provider Network and a network comprising a Media Gateway, said Telephony Service Provider Network comprising a Media Gateway Controller, said method comprising: instigating a test call between a first endpoint on the Media Gateway Controller acting as a calling party, and an endpoint on the Media Gateway acting as a called party; receiving a reply comprising the local Session Description Protocol of the endpoint of the Media Gateway at the Media Gateway Controller; receiving an empty/noise media packet from the Media Gateway at the first endpoint of the Media Gateway Controller; and comparing the source IP address and port of the empty/noise media packet received at the first endpoint of the Media Gateway Controller with the IP address and port contained in the received local Session Description Protocol of the endpoint of the Media Gateway, wherein if the IP addresses are different or the ports are different then a Network Address and Port Translator is determined to be present, otherwise, if the IP addresses are the same and the ports are the same then a Network Address and Port Translator is determined not to be present.

In a preferred embodiment, if a Network Address and Port Translator is found to present, said method further comprises determining the type of Network Address and Port Translator that is present. Preferably, determining the type of Network Address and Port Translator comprises: changing the remote Session Description Protocol for the call to one with a different IP address, but still on the same Media Gateway Controller, corresponding to a second virtual media endpoint; sending a message to modify the Session Description Protocol to the Media Gateway from the Media Gateway Controller; prompting the Media Gateway to send empty/noise media packets to the changed IP address and port corresponding to the second virtual media endpoint on the Media Gateway Controller; receiving the empty/noise media packets at the second virtual media endpoint on the Media Gateway Controller; comparing the source IP address and port of the empty/noise media packets received at the second virtual media endpoint of the Media Gateway Controller with the source IP address and port of the media packets received at the first virtual media endpoint of the Media Gateway Controller, wherein if the same source IP address and port is used for the media packets sent to the first and the second virtual media endpoints on the Media Gateway Controller, the Network Address and Port Translator is determined to be a Cone Network Address and Port Translator, but if a different source IP address or port is used for the media packets sent to the first and the second virtual media endpoints on the Media Gateway Controller, the Network Address and Port Translator is determined to be a Symmetric Network Address and Port Translator.

According to a second aspect of the invention there is provided a computer program for use in a computer for determining the presence of a Network Address and Port Translator between a Telephony Service Provider Network and a network comprising a Media Gateway, according to the first aspect.

According to a third aspect there is provided a computer program stored on a data carrier for use in a computer for determining the presence of a Network Address and Port Translator between a Telephony Service Provider Network and a network comprising a Media Gateway, according to the first aspect.

According to a fourth aspect there is provided a Media Gateway Controller comprising a first virtual media endpoint, and capable of determining the presence of a Network Address and Port Translator between a Telephony Service Provider Network in which said Media Gateway Controller is located, and a network comprising a Media Gateway, said Media Gateway Controller operable to: instigate a test call between its first virtual media endpoint acting as a calling party, and an endpoint on the Media Gateway acting as a called party; receive a reply comprising the local Session Description Protocol of the endpoint of the Media Gateway; receive empty/noise media packets from the Media Gateway at its first virtual media endpoint; and compare the source IP address and port of the empty/noise media packets received at its first virtual media endpoint with the IP address and port contained in the received local Session Description Protocol of the endpoint of the Media Gateway, wherein if the IP addresses are different or the ports are different then a Network Address and Port Translator is determined to be present, otherwise, if the IP addresses are the same and the ports are the same then a Network Address and Port Translator is determined not to be present.

In a preferred embodiment if a Network Address and Port Translator is found to be present, said Media Gateway Controller is operable to determine the type of Network Address and Port Translator that is present. Preferably, further comprising a second virtual media endpoint, wherein if a Network Address and Port Translator is found to be present, said Media Gateway Controller is operable to: change the remote Session Description Protocol for the call to one with a different IP address and port, but still on said Media Gateway Controller, corresponding to said second virtual media endpoint; send a message to modify the Session Description Protocol to the Media Gateway; receive empty/noise media data packets at the changed IP address and port, corresponding to its second virtual media endpoint, from the Media Gateway; and compare the source IP address and port of the empty/noise media packets received at its second virtual media endpoint with the IP address and port of the media packets received at its first virtual media endpoint, wherein if the same source IP address and port is used for the media packets sent to said first and said second virtual media endpoints, the Network Address and Port Translator is determined to be a Cone Network Address and Port Translator, but if a different source IP address or port is used for the media packets sent to said first and said second virtual media endpoints, the Network Address and Port Translator is determined to be a Symmetric Network Address and Port Translator.

According to a fifth aspect there is provided a packet-switched network comprising a Media Gateway Controller according to the forth aspect of the invention.

Other aspects and features of the present invention will become apparent to those ordinarily skilled in the art upon review of the following description of specific embodiments of the invention in conjunction with the accompanying figures.

DETAILED DESCRIPTION OF THE PREFERRED EMBODIMENTS

Figure 1:
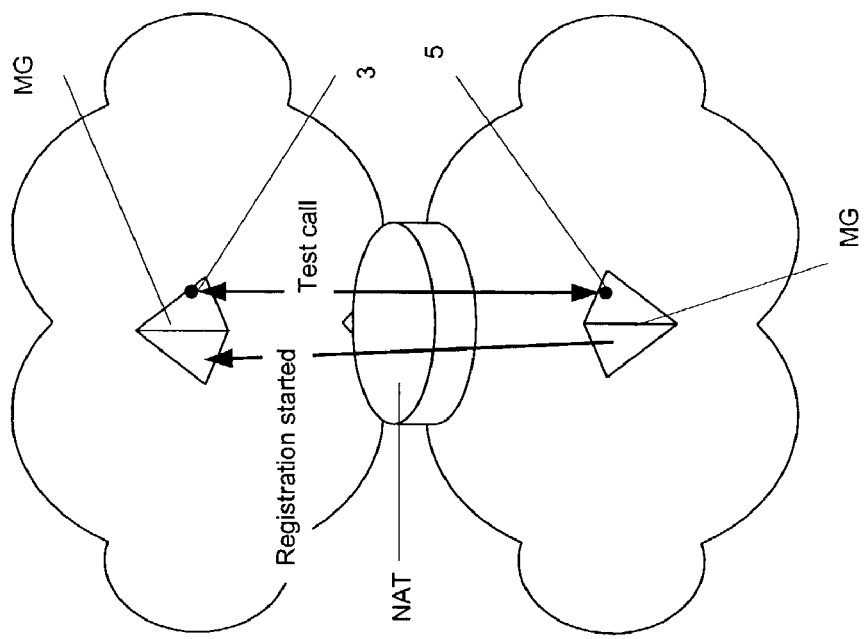
FIG. 1 is a schematic diagram showing messaging for instigating a test call between a media endpoint of a Media Gateway and a virtual media endpoint on a Media Gateway Controller, during registration, in accordance with an embodiment of the present invention.

The present invention proposes a technique that involves instigating a "test call" during Media Gateway registration, as illustrated in FIG. 1, to determine the existence and type of a NAT. In this test call a virtual media endpoint 3 on the Media Gateway Controller (MGC) acts as the calling party and a real media endpoint 5 on the Media Gateway (MG) acts as the called party. A media endpoint is a source or a sink of media flow, normally Real-time Transport Protocol (RTP) packets. The media endpoints on the MGC are "virtual" since a MGC would not normally have media endpoints and, therefore, they are not "real" endpoints, as such, as in the case of a MG. The MGC is able to deduce the existence of a Network Address Translator (NAT), by examining the media packets (usually RTP packets) sent to the virtual media endpoint 3. If a NAT is determined to be present, the MGC instructs the endpoint 5 to now send media packets to virtual media endpoint 4 on the MGC that has a different IP address than endpoint 3. By comparing the media packets received by endpoint 4 with the packets received previously by endpoint 3, the MGC is able to deduce whether the type of NAT is Cone or Symmetric.

Figure 2:
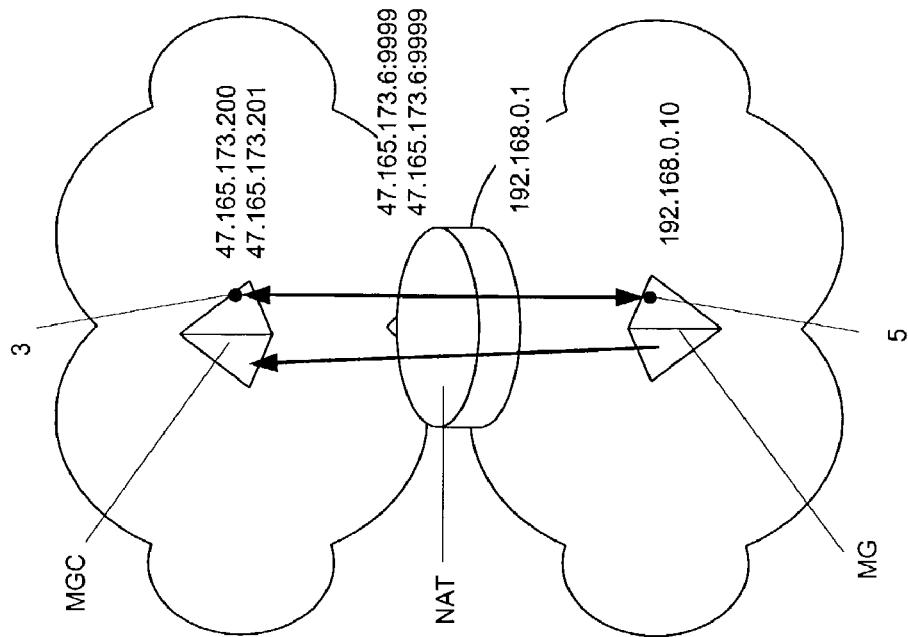
FIG. 2 is a schematic diagram showing the IP address changes that take place during the messaging shown in FIG. 1, when a Cone NAT has been detected in accordance with a preferred embodiment of the present invention.

An example of how a Cone NAT between a Telephony Service Provider (TSP) network and a network containing a MG can be detected is described with reference to FIG. 2. This technique requires that the MGC has two virtual media endpoints with different IP addresses on which it may receive media packets. The MG is located behind a Cone NAT, and the MGC is located in the TSP network. When the MG is first being brought into service, it attempts to register with its MGC by sending a registration message to the MGC (for example, a ReStart In Progress (RSIP) message in Multimedia Gateway Control Protocol (MGCP)). Receipt of the registration message triggers the MGC to instigate a Test Call between its virtual media endpoints and a media endpoint on the MG to deduce that the MG is behind a Cone NAT. The first part of the test call establishes if there is a NAT between the MG and the TSP network, by comparing the address and port pair from the local Session Description Protocol (SDP) with that of the media packet (usually RTP) received on the first MGC virtual media endpoint. If a NAT is found, then the second part of the test call deduces the type of NAT by instructing the MG to send media to the second MGC virtual media endpoint, and comparing the source address and port pair from the packets received on the first MGC virtual media endpoint, with those received on the second MGC virtual media endpoint.

There are two message paths established between the MG and the MGC: one for the control messages exchange between the MG and the MGC (for example, MGCP messages such as CRCX, MDCX, DLCX); and one for the media path (for example RTP flow between the media endpoints). If the MG is behind a NAT, then when the MG registers with its MGC, the registration message (i.e. control message, for example RSIP), will go through the NAT, and as it does, a bind will be created. The MGC notes the source of the registration message and uses that address port for all future communication with that MG. Hence there are no problems with control messages traversing the NAT.

Figure 3:
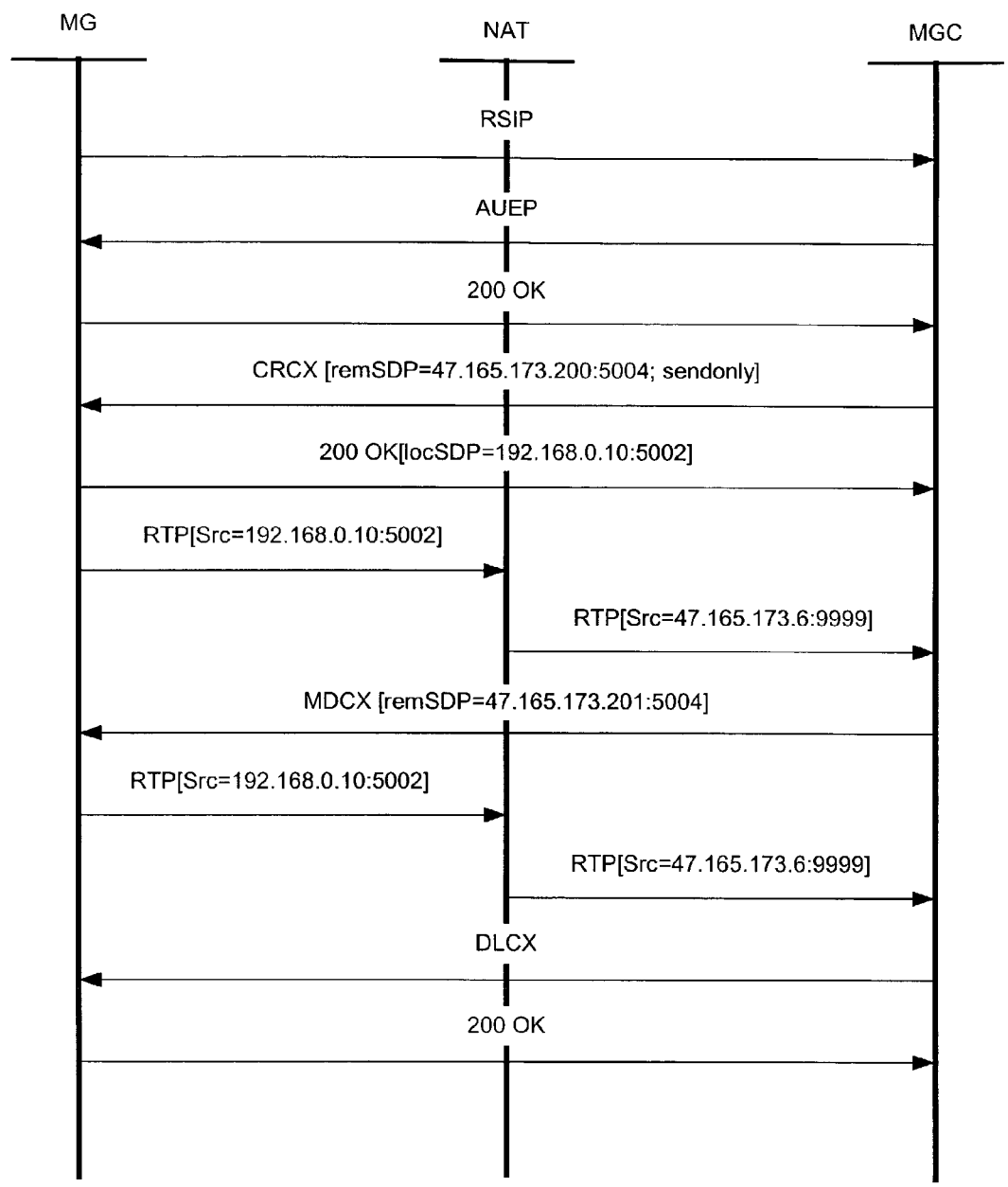
FIG. 3 is a message sequence chart following a specific format known in the art, and shows the flow of messaging that occurs between the Media Gateway Controller and the Media Gateway when a Cone NAT is detected in accordance with the preferred embodiment.

FIG. 3 shows the flow of messages taking place between the MG and the MGC using pseudo-MGCP device control protocol. Firstly, the MG sends ReStart In Progress (RSIP) messages to register its media endpoints. The MGC chooses one of these for its test call and sends an Audit Endpoints message (AUEP) to it to make sure the media endpoint 5 is available, and to query its capabilities. The MG responds indicating that the media endpoint 5 is okay and what its capabilities are. At this time, the media endpoints have not been fully initialised in the MGC and the MG has not been supervised to scan for off-hook conditions etc. Therefore there is no need to worry about the media endpoints being used for real calls yet (as there will be no dial tone, and the MG will not report off-hook, digits, etc. to the MGC). The advantage of using this technique during registration is that it does not impact on the real-time usage of the device, i.e. the MG endpoints.

Next, the MGC sends a Create Connection (CRCX) message to the media endpoint on the MG to initiate a test call on the endpoint. The remote Session Description Protocol (SDP) sent in the CRCX message contains the IP address and port of a virtual media endpoint 3 on the MGC. The CRCX message also contains a prompt to place the media endpoint 5 of the MG into a mode requiring it to send media packets (i.e. sendonly or sendrecv mode.) The MG replies with the local SDP of the media endpoint 5, which the MGC takes note of. The MG then sends empty/silence/noise packets to the IP address and port that it was given in the remote SDP (i.e. to the virtual media endpoint 3 on the MGC). Note that the MG sends empty/silence/noise packets as it has no available voice data to send since the test call is being instigated during registration. The type of packet sent is dependent upon the configuration of the MG. As the packet goes through the NAT, a bind is created and its source address and port are changed. When the packet arrives at the virtual media endpoint 3 on the MGC, the MGC compares the source address and port of the packet with the IP address and port contained in the local SDP it had received previously from the media endpoint 5 on the MG. Since the source address and port of the packet differ from the address and port from the local SDP, the MGC concludes there is a NAT between the TSP network and the network containing the MG.

The MGC then sends a Modify connection (MDCX) message to the MG, changing the remote SDP for this call so that it contains the IP address and port of a second virtual media endpoint 4 on the MGC. The second virtual media endpoint 4 has a different IP address than that of the virtual media endpoint 3, but is still on the same MGC. The MG sends the empty/silence/noise packets to the new address and port. Since the NAT in this example is a Cone NAT, the same bind is used for these packets, and thus the source address and port is modified in the same way as before. When the packets arrive at the second virtual media endpoint 4 on the MGC, the MGC compares the source address and port of these packets with those that it had received on the virtual media endpoint 3. Since they are the same, the MGC concludes that the NAT is a Cone NAT. The MGC stores this information in its database for later use, and sends a DLCX message to take down the test call. MG registration then continues as usual.

Alternatively, this technique could be used during the setting up of a call, rather than during registration. Advantageously, this allows real-time discovery of NATs, however, it will slow down the call set-up time. A further advantage of using this technique during the setting up of a call, is that by performing the test call on the MG endpoint actually involved in the call, it is possible to determine the actual NAT bind that will be used for the media flow of the call, if the NAT is a Cone NAT.

The information that the MGC has stored in its database allows it to know which MGs are behind NATs. It can then make use of a NAT traversal strategy (such as the use of a Media Proxy) for calls involving these MGs. MGCs are conventionally used for controlling the devices that source and sink media flows (usually RTP), but the described technique uses the MGC itself as a sink of a media flow.

Figure 4:
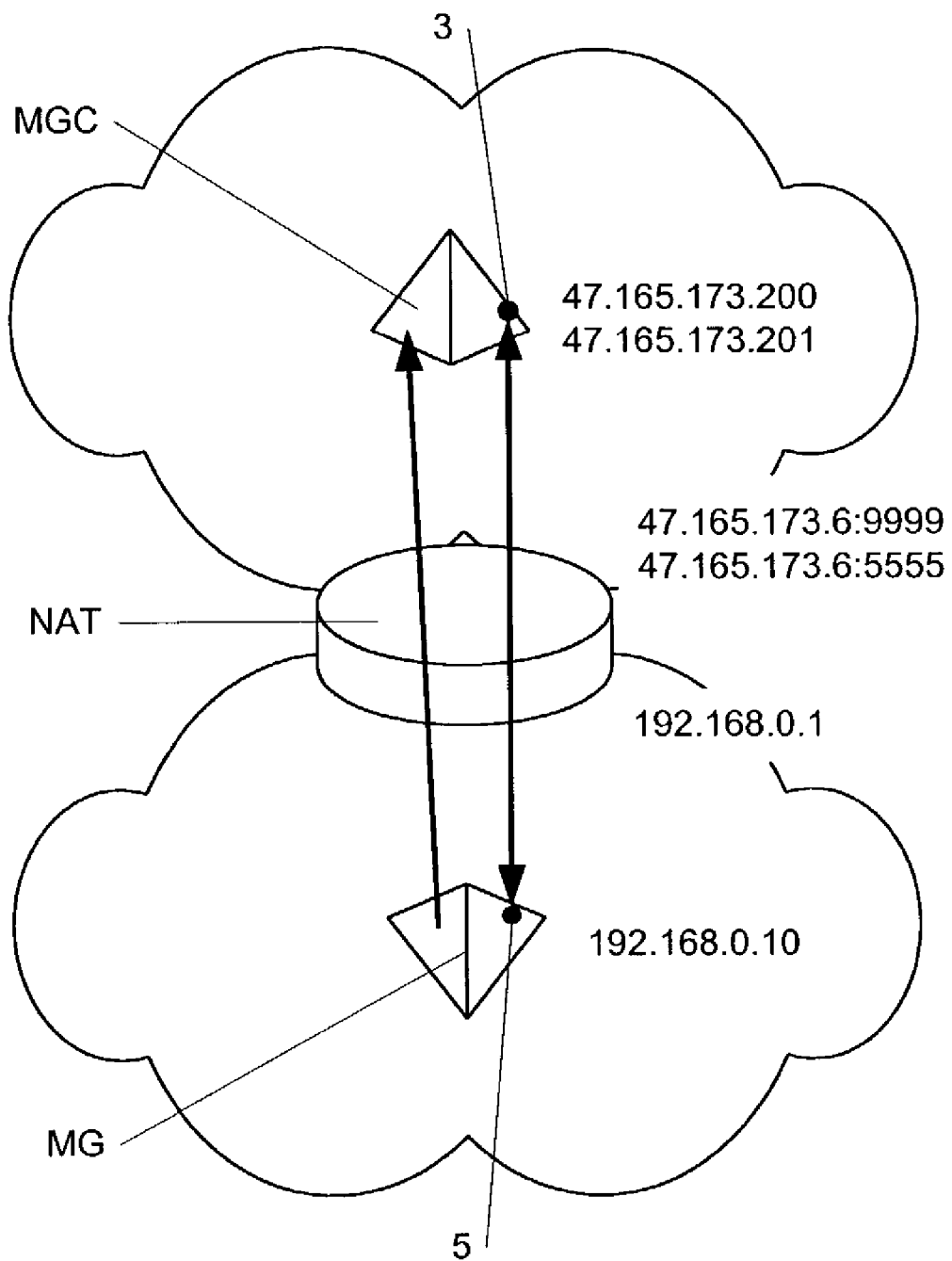
FIG. 4 is a schematic diagram showing the IP address changes that take place during the messaging for a test call between the endpoints of a Media Gateway Controller and a Media Gateway when a Symmetric NAT has been detected in accordance with a further embodiment of the present invention.
Figure 5:
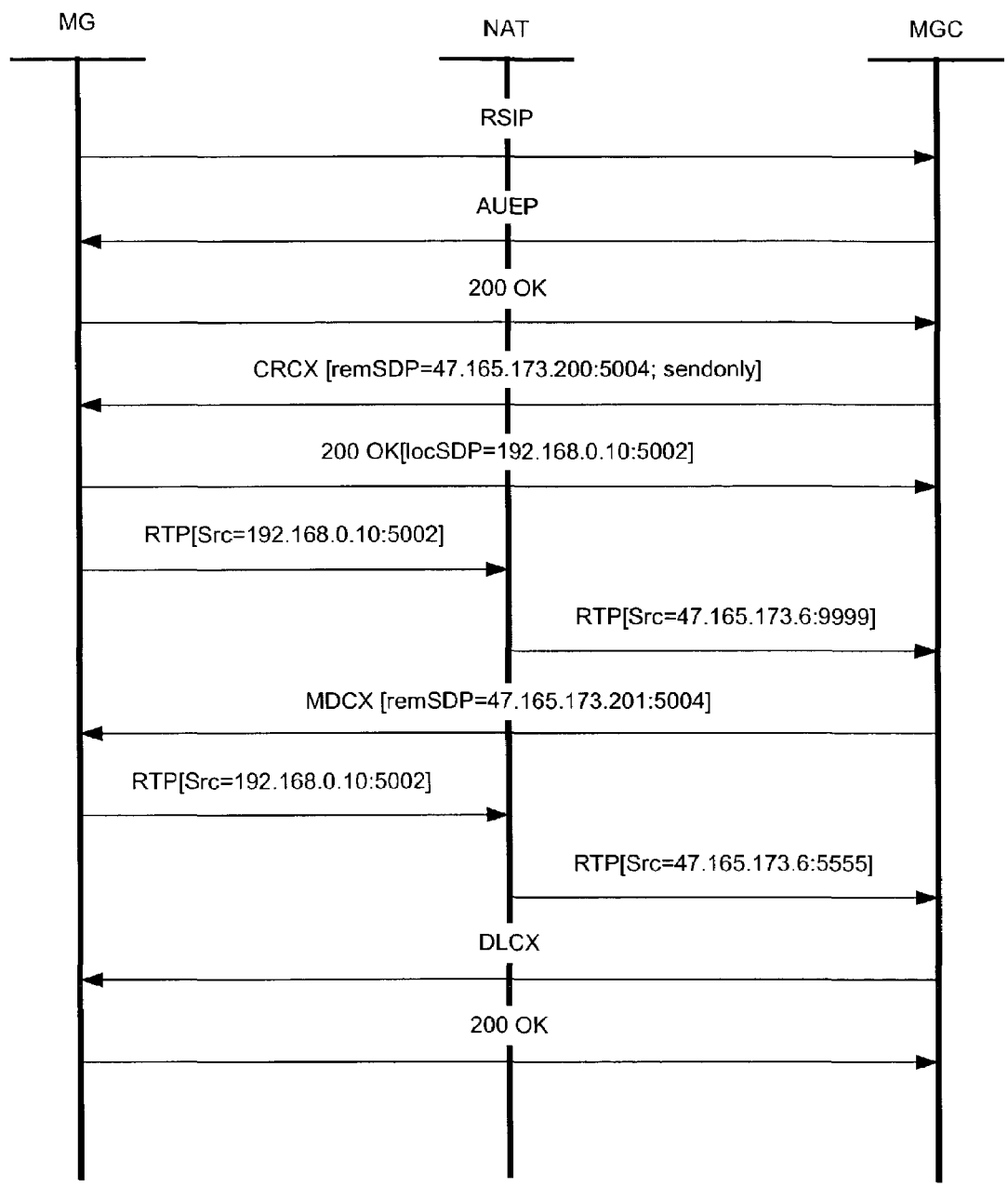
FIG. 5 is a message sequence chart following a specific format known in the art, and shows the flow of messaging that occurs between the Media Gateway Controller and the Media Gateway when a Symmetric NAT is detected in accordance with the embodiment of the invention shown in FIG. 4.

With reference to FIGS. 4 and 5, the differences in logic for determining the existence of a Symmetric NAT are given below. As shown in FIG. 4, instead of a Cone NAT there is now a Symmetric NAT between the TSP network and the MG's network.

The first part of the test call (that determines NAT existence) for Symmetric NATs is identical to the first part of the test call in the Cone NAT example. Likewise, the set-up for the second part of the test call is the same as the example of the Cone NAT, and the media endpoint 5 on the MG is instructed to send media to the second virtual media endpoint 4 on the MGC. As in the Cone NAT example, the MG sends the empty/silence/noise packets to the new address and port (the second virtual media endpoint 4), but since the NAT is Symmetric, a new bind is created for these packets. Thus the source address and port of these packets are modified differently than the packets that were sent to the media endpoint 3 on the MGC in the first part of the test call. When the packets arrive at the second virtual media endpoint 4 on the MGC, the MGC compares their source address and port with the source address and port of those packets that had arrived on the virtual media endpoint 3 in the first part of the test call. Since they are different, the MGC concludes that the NAT is a Symmetric NAT. Then as described previously for the example of the Cone NAT, the MGC stores this information in its database and sends a DLCX message to take down the test call, and MG registration continues as usual.

Advantageously, the described technique allows the existence and type of NAT to be determined without the necessity of changing anything outside the TSP network.

Although Multimedia Gateway Control Protocol (MGCP) is used in the examples described above, any Device Control Protocol (DCP), such as H.248 (MEGACO), NCS or ASPEN, could be used instead. In addition, Session Initiation Protocol (SIP), H.323, or other similar SDP exchange protocols that are not DCPs and that do not always fit into the MG/MGC architecture, could be used instead. In the examples described above, a number of assumptions have been made. Firstly, it has been assumed that the MG will send empty/silence/noise media packets if it has been put into send mode but does not have any real media to send. The specifications of most DCPs require this behaviour, but if a MG cannot send such packets, then the method can be modified so that the endpoint is instructed to send a signal, for example a ring tone, instead of silence or noise. Secondly, it has been assumed that if the same NAT bind is used for a different destination, then the NAT must be some type of Cone NAT (whether it be full, restricted, or port restricted). This assumption is true by definition if one follows the definition of Cone and Symmetric NAT found in the Internet Engineering Task Force (IETF) STUN specification, "http://www.ietf.org/internet-drafts/draft-ietf-midcom-stun-02.txt". Further examples of how the present technique can used to determine the existence and type of NAT are described below.

In one variation of the present technique, one or both of the virtual media endpoints may be housed on a device external to the MGC, but under the MGC's control. Such a device would have to be capable of sinking a media flow, and have an interface in the TSP. This would allow the media flows for one or both parts of the test call to be sinked on the device external to the MGC, but reported to the MGC. Examples of such devices could be a MG located in the TSP dedicated for use in such test calls, or a Media Proxy. Such a variation using a Media Proxy is described below.

Figure 6:
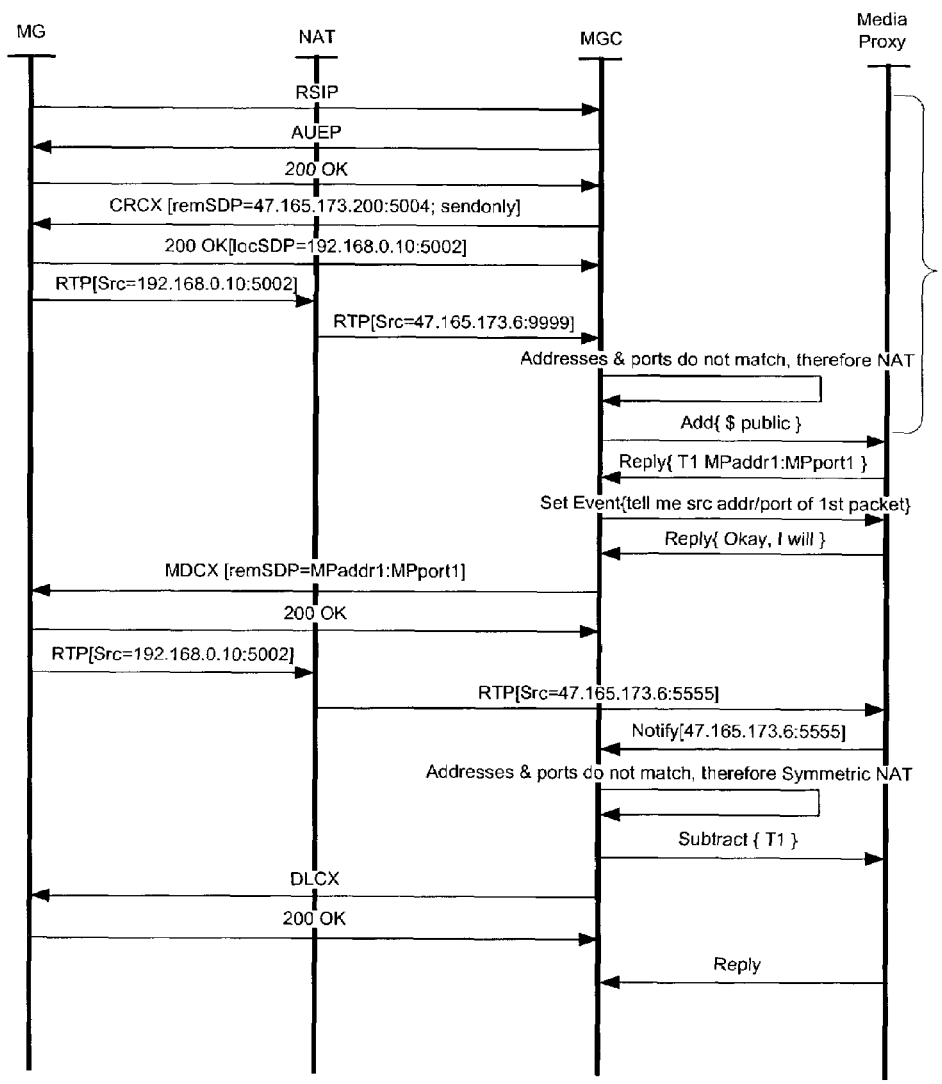
FIG. 6 is a message sequence chart following a specific format known in the art, and shows the flow of messaging that occurs in accordance with another embodiment of the present invention where a MGC virtual media endpoint and a Media Proxy are used to deduce the presence of Symmetric NAT.

With reference to FIG. 6, an example of how a virtual media endpoint on an MGC and a Media Proxy can be used to deduce the existence and type of a NAT (in this example, a Symmetric NAT) is shown in the message sequence chart. Note that the protocol shown for messaging between the MG and the MGC is psuedo-MGCP, whereas the protocol shown for messaging between the MGC and the Media Proxy is pseudo-H.248. Although, the skilled person will appreciate that any other suitable DCP or Media Proxy control protocol could be used instead. The procedure for deducing the existence of the NAT is the same as already discussed above for the example of the Cone NAT between the TSP Network and the network containing the MG, as illustrated in FIG. 3. The steps common to both procedures are indicated in FIG. 6 with an asterix next to them.

After the MGC has compared the source address and port of the empty/silence/noise packet with the address and port from the local SDP it had received previously, and concluded that there is a NAT because they are different, the MGC sends a message to the Media Proxy requesting the reservation of a public IP address and port for media flow. The Media Proxy sends a reply to the MGC containing the reserved IP address and port. The MGC sends another message to the Media Proxy telling it to inform the MGC of the source IP address and port of the first media packet it receives on its reserved IP address and port. The Media Proxy responds by indicating it will. Next the MGC sends a Modify Connection request (MDCX) to the media endpoint on the MG instructing it to send its media to the reserved IP address and port on the Media Proxy. The MG acknowledges the instruction, and then begins to send the empty/silence/noise RTP packets to the reserved IP address and port on the Media Proxy. As the RTP packets traverse the NAT, their source IP address and port are modified differently than the source IP address and port of those packets that were destined for the virtual media endpoint on the MGC, i.e. a new bind is created for these packets, because the NAT being traversed is a Symmetric NAT. When the first RTP packet arrives at the Media Proxy, the Media Proxy notifies the MGC of the packet's source IP address and port. Then, as in the two previously described examples, the MGC compares the source address and port of this packet with that of the packets that had been sent to its virtual media endpoint. Since they are different, the MGC concludes that the NAT is a Symmetric NAT, and the MGC stores this information in its database and sends a DLCX message to take down the test call, and a message to the Media Proxy to free the IP address and port that it had reserved. MG registration then continues as usual.

Figure 7:
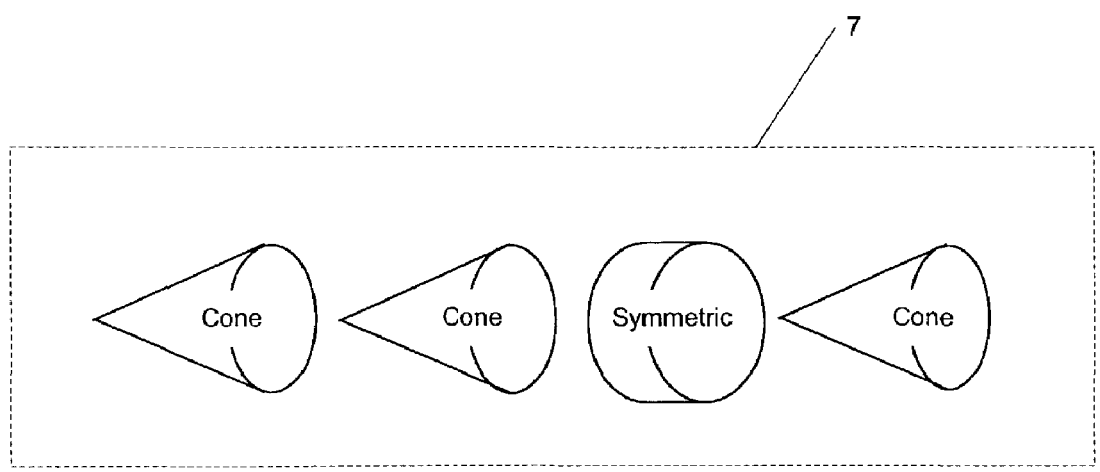
FIG. 7 is a schematic diagram showing an example of a NAT aggregate.

The technique described in this document can be used even when there is more than one NAT between the MGC and MG, but only if arranged in series, i.e. non-parallel, as illustrated in FIG. 7. The technique enables the detection of a NAT aggregate 7, and the type of the strongest NAT in the NAT aggregate 7. For example, if there are four NATs in series and one of them is a Symmetric NAT, then because a change in the source IP address and port is detected by the MGC due to the presence of the symmetric NAT, the MGC determines that there is at least one symmetric NAT in the NAT aggregate 7. It is not, however, possible for the MGC to determine whether there are any Cone NATs present in the NAT aggregate 7 in addition to the Symmetric one(s) detected, as the Cone NATs do not change the source IP address and port of packets based on destination. Only if all four NATs in the aggregate are Cone NATs, can the MGC determine that the NAT aggregate is composed of Cone NATs, because there is no change detected in the IP address and port using the technique described above.

Advantageously, the methods described herein may be implemented in software, hardware, or a mixture of both.

It will be appreciated that the techniques described herein may be used with trivial modifications as would be contemplated by the skilled person to deduce the existence and type of NATs in network systems having MGs and MGCs and/or Media Proxies, and that such modifications would fall within the scope of the invention as claimed.

Although the embodiments of the invention described with reference to the drawings comprise computer apparatus and processes performed in computer apparatus, the invention also extends to computer programs, particularly computer programs on or in a carrier, adapted for putting the invention into practice. The program may be in the form of source code, object code, a code intermediate source and object code such as in partially compiled form, or in any other form suitable for use in the implementation of the processes according to the invention. The carrier may be any entity or device capable of carrying the program.

For example, the carrier may comprise a storage medium, such as ROM, for example a CD ROM or a semiconductor ROM, or a magnetic recording medium, for example a floppy disc or hard disk.

Alternatively, the carrier may be an integrated circuit in which the program is embedded, the integrated circuit being adapted for performing, or for use in the performance of, the relevant processes.

Although the invention has been shown and described with respect to a best mode embodiment thereof, it should be understood by those skilled in the art that the foregoing and various other changes, omissions and additions in the form and detail thereof may be made therein without departing from the scope of the invention as claimed.

I claim:

1. A method of determining a presence of a Network Address and Port Translator between a Telephony Service Provider Network and a network comprising a Media Gateway, said Telephony Service Provider Network comprising a Media Gateway Controller, said method comprising:

the Media Gateway Controller instigating a test call between a first virtual endpoint on the Media Gateway Controller acting as a calling party, and an endpoint on the Media Gateway acting as a called party by transmitting a Create Connection message to the endpoint on the Media Gateway;

receiving a reply comprising a local Session Description Protocol of the endpoint of the Media Gateway at the Media Gateway Controller;

receiving an empty/noise media packet from the Media Gateway at the first virtual endpoint of the Media Gateway Controller; and comparing source IP address and port of the empty/noise media packet received at the first virtual endpoint of the Media Gateway Controller with IP address and port contained in the received local Session Description Protocol of the endpoint of the Media Gateway, wherein if the IP addresses are different or the ports are different then a Network Address and Port Translator is determined to be present, otherwise, if the IP addresses are the same and the ports are the same then a Network Address and Port Translator is determined not to be present.

2. A method according to claim 1, wherein the test call is instigated during registration of the Media Gateway with the Media Gateway Controller.

3. A method according to claim 1, wherein the test call is instigated between a first virtual media endpoint on the Media Gateway Controller and a real media endpoint on the Media Gateway.

4. A method according to claim 1, wherein the test call between the Media Gateway and the Media Gateway Controller is instigated during set-up of an actual call.

5. A method according to claim 1, wherein said Telephony Service Provider Network and said network comprising the Media Gateway are packet-switched networks.

6. A method according to claim 5 for use with voice over Internet Protocol applications.

7. A method according to claim 1, wherein instigating the test call comprises sending a message to create a connection to the endpoint on the Media Gateway from the Media Gateway Controller, wherein a remote Session Description Protocol is sent in the message to create the connection and corresponds to a first virtual media endpoint on the Media Gateway Controller.

8. A method according to claim 7, wherein the empty/noise media packets from the Media Gateway are received at the first virtual media endpoint on the Media Gateway Controller.

9. A method according to claim 7, wherein if a Network Address and Port Translator is found to present, said method further comprises:

determining the type of Network Address and Port Translator that is present.

10. A method according to claim 9, wherein determining the type of Network Address and Port Translator comprises:
   changing the remote Session Description Protocol for the call to one with a different IP address, but still on the same Media Gateway Controller, corresponding to a second virtual media endpoint;
   sending a message to modify the Session Description Protocol to the Media Gateway from the Media Gateway Controller;
   prompting the Media Gateway to send empty/noise media packets to the changed IP address and port corresponding to the second virtual media endpoint on the Media Gateway Controller;
   receiving the empty/noise media packets at the second virtual media endpoint on the Media Gateway Controller;
   comparing the source IP address and port of the empty/noise media packets received at the second virtual media endpoint of the Media Gateway Controller with the source IP address and port of the media packets received at the first virtual media endpoint of the Media Gateway Controller, wherein if the same source IP address and port is used for the media packets sent to the first and the second virtual media endpoints on the Media Gateway Controller, the Network Address and Port Translator is determined to be a Cone Network Address and Port Translator, but if a different source IP address or port is used for the media packets sent to the first and the second virtual media endpoints on the Media Gateway Controller, the Network Address and Port Translator is determined to be a Symmetric Network Address and Port Translator.

11. A method according to claim 10, wherein the message to create a connection instructs the endpoint on the Media Gateway to be in a mode for sending media packets.

12. A method according to claim 10, wherein the test call is instigated during registration of the Media Gateway with the Media Gateway Controller.

13. A method according to claim 10, wherein the test call between the Media Gateway and the Media Gateway Controller is instigated during set-up of an actual call.

14. A method according to claim 10, wherein the test call is instigated between the virtual media endpoint on the Media Gateway Controller and a real media endpoint on the Media Gateway.

15. A method according to claim 10, wherein the Media Gateway Controller stores information relating to the type of Network Address and Port Translator determined.

16. A method according to claim 10, wherein said Telephony Service Provider and said Media Gateway Networks are packet-switched networks.

17. A method according to claim 16 for use with voice over IP applications.

18. A method according to claim 10, wherein receipt of a registration message from the Media Gateway triggers the instigating of the test call.

19. A computer readable medium embodied with a computer program that comprises computer executable instructions for use in a computer for determining the presence of a Network Address and Port Translator between a Telephony Service Provider Network and a network comprising a Media Gateway, according to the method of claim 10.

20. A computer readable medium embodied with a computer program that comprises computer executable instructions for use in a computer for determining the presence of a Network Address and Port Translator between a Telephony Service Provider Network and a network comprising a Media Gateway, according to the method of claim 1.

21. A Media Gateway Controller comprising a first virtual media endpoint, and capable of determining the presence of a Network Address and Port Translator between a Telephony Service Provider Network in which said Media Gateway Controller is located, and a network comprising a Media Gateway, wherein said Media Gateway Controller:
   investigates a test call between the first virtual media endpoint acting as a calling party, and an endpoint on the Media Gateway acting as a called party by the first virtual media endpoint transmitting a Create Connection message to the endpoint on the media gateway:
   receives a reply comprising the local Session Description Protocol of the endpoint of the Media Gateway;
   receives empty/noise media packets from the Media Gateway at its first virtual media endpoint; and
   compares source IP address and port of the empty/noise media packets received at its first virtual media endpoint with IP address and port contained in the received local Session Description Protocol of the endpoint of the Media Gateway, wherein if the IP addresses we different or the ports we different ten a Network Address and Port Translator is determined to be present, otherwise, if the IP addresses are the same and the ports are the same ten a Network Address and Port Translator is determined not to be present.

22. A Media Gateway Controller according to claim 21, wherein if a Network Address and Port Translator is found to be present, said Media Gateway Controller is operable to:
   determine the type of Network Address and Port Translator that is present.

23. A Media Gateway Controller according to claim 21, further comprising a second virtual media endpoint, wherein if a Network Address and Port Translator is found to be present, wherein said Media Gateway Controller:
   changes the remote Session Description Protocol for the call to one with a different IP address and port, but still on said Media Gateway Controller, corresponding to said second virtual media endpoint;
   sends a message to modify the Session Description Protocol to the Media Gateway;
   receives empty/noise media data packets at the changed IP address and port, corresponding to its second virtual media endpoint, from the Media Gateway; and
   compares the source IP address and port of the empty/noise media packets received at its second virtual media endpoint with the IP address and port of the media packets received at its first virtual media endpoint, wherein if the same source IP address and port is used for the media packets sent to said first and said second virtual media endpoints, the Network Address and Port Translator is determined to be a Cone Network Address and Port Translator, but if a different source IP address or port is used for the media packets sent to said first and said second virtual media endpoints, the Network Address and Port Translator is determined to be a Symmetric Network Address and Port Translator.

24. A Media Gateway Controller according to claim 23, comprising a data store capable of holding information relating to the type of Network Address and Port Translator determined.

25. A packet-switched network comprising a Media Gateway Controller according to claim 23.

26. A packet-switched network comprising a Media Gateway Controller according to claim 21.

* * * * *